US010607571B2

United States Patent
Utsch

(10) Patent No.: US 10,607,571 B2
(45) Date of Patent: Mar. 31, 2020

(54) METHOD AND SYSTEM FOR THE DISTRIBUTION OF SYNCHRONIZED VIDEO TO AN ARRAY OF RANDOMLY POSITIONED DISPLAY DEVICES ACTING AS ONE AGGREGATED DISPLAY DEVICE

(71) Applicant: Thomas Frederick Utsch, Allentown, PA (US)

(72) Inventor: Thomas Frederick Utsch, Allentown, PA (US)

(*) Notice: Subject to any disclaimer, the term of this patent is extended or adjusted under 35 U.S.C. 154(b) by 0 days.

(21) Appl. No.: 15/676,406

(22) Filed: Aug. 14, 2017

(65) Prior Publication Data
US 2019/0051268 A1    Feb. 14, 2019

(51) Int. Cl.
G09G 5/00    (2006.01)
G09G 5/12    (2006.01)
G06F 3/14    (2006.01)

(52) U.S. Cl.
CPC ............. *G09G 5/12* (2013.01); *G06F 3/1446* (2013.01); *G09G 2300/026* (2013.01); *G09G 2370/042* (2013.01); *G09G 2370/16* (2013.01)

(58) Field of Classification Search
CPC ..... G06F 3/1446; G06F 3/1431; G09G 5/006; G09G 5/12; G09G 2310/08; G09G 5/373; G09G 2300/026; G09G 2370/02; G09G 2340/04; G09G 2360/04
See application file for complete search history.

(56) References Cited

U.S. PATENT DOCUMENTS

| | | | |
|---|---|---|---|
| 9,271,137 B2 | 2/2016 | Chan et al. | |
| 9,298,362 B2* | 3/2016 | Lucero | H04N 21/4788 |
| 9,715,506 B2 | 4/2017 | Rosen et al. | |
| 9,716,855 B2 | 7/2017 | Gehring et al. | |
| 9,912,845 B2* | 3/2018 | Yamada | G09G 5/12 |
| 9,961,295 B2* | 5/2018 | Takada | G06F 3/1446 |
| 2005/0083642 A1* | 4/2005 | Senpuku | G06F 1/1616 |
| | | | 361/679.21 |
| 2012/0206319 A1* | 8/2012 | Lucero | H04N 21/4788 |
| | | | 345/1.3 |
| 2015/0084837 A1* | 3/2015 | Mese | G06F 3/1446 |
| | | | 345/1.3 |
| 2015/0172594 A1* | 6/2015 | Takada | G06F 3/1446 |
| | | | 386/219 |
| 2017/0344330 A1* | 11/2017 | Masumoto | G06F 3/1446 |

* cited by examiner

*Primary Examiner* — Vijay Shankar
(74) *Attorney, Agent, or Firm* — Caesar Rivise, PC

(57) ABSTRACT

A method which allows a group of people to each contribute their cell phone, smartphone or tablet or other similar display device by placing all of the display devices together randomly in a large array or mosaic, using a feedback loop to analyze the position and orientation of each display device, and then to stream a video or image that is displayed across the entire array of devices such that it plays in synchronization using the total array as one screen.

20 Claims, 7 Drawing Sheets

METHOD AND SYSTEM FOR THE DISTRIBUTION OF SYNCHRONIZED VIDEO TO AN ARRAY OF RANDOMLY POSITIONED DISPLAY DEVICES ACTING AS ONE AGGREGATED DISPLAY DEVICE

CROSS REFERENCE TO RELATED APPLICATIONS

This application claims the benefit of U.S. Provisional Applications U.S. 62/376,866 filed Aug. 18, 2016 and entitled "Sqramble", U.S. 62/385,452 filed Sep. 9, 2016 and entitled "Sqramble Video", and U.S. 62/442,754 filed Jan. 18, 2017 and entitled "Sqramble Video Advertising Integration," which applications are incorporated herein by reference.

FIELD OF THE INVENTION

The present invention relates to a system and method for using multiple display devices, such as cell phones, smart phones, tablet computers, or other devices with an electronically controllable screen or display, to display one image or video across the totality of all of the display devices, regardless of where the display devices are positioned or how they are oriented relative to each other. The invention also provides a system and method for identifying the exact position and orientation of each display device. It further provides a system and method for displaying an advertising banner or border overlayed on the image or video across the totality of the display devices.

BACKGROUND OF THE INVENTION

As data rates to mobile devices continue to get faster and small cameras attached to cell phones and tablets get better in terms of image quality, more and more people regularly watch images or videos on their cell phones and tablets. Due to the screen sizes of these devices, it can be difficult to clearly see the details of the image or video and to share the experience of watching the video together with other people. Also the limited size of the display screens on the devices makes it difficult to display an advertising border or banner simultaneously with the video.

Prior art systems have utilized an array of television sets mounted together to display a composite image across the collective screens of the television sets. However, proper display of the composite image in such prior art systems has required an advance specification or prior knowledge of where each television set is located in the array. That is, prior art television arrays for displaying composite images have required advance knowledge of where each television screen is positioned in the array and how it is oriented relative to the composite image, in order to determine what particular portion of the composite image is going to be generated on the screen of each television set.

SUMMARY OF THE INVENTION

The present invention is directed to a method and system that allow a group of people to each contribute their individual cell phone or tablet or other similar display device to a composite display, by placing all of the devices together in ad hoc fashion to form a large array or mosaic, and then to watch a video or image that is displayed across the entire array of devices such that the video or image plays in synchronization using the total array as one screen. In contrast to prior art television arrays for displaying composite images, the system of the present invention enables a composite display or image to be generated on the fly, without prior specification or knowledge of which device is located where in the device array or how the device is oriented in relation to other devices used to generate the composite display.

Most modern smartphones are used to take portrait-oriented videos, whereas most available computer displays are landscape-oriented. This invention accordingly further allows for the display area created by the collective display devices to map to the orientation and aspect ratio of the source video. The invention then enables user generated videos which are circular in shape to be used in creating the composite display, including a composite display with an advertising banner or border.

Generally speaking, exemplary embodiments of the present invention enable users with a smart phone to set all of their phones on a table in an ad hoc array/mosaic where they generally are positioned adjacent to one another, either vertically or horizontally or in a mixture of orientations, and then watch a video from one of the users played using the entire array of smart phones as one contiguous display.

For example in one embodiment the user whose video is being played serves as the controller, cueing up the video to be played and initiating a display session. The other users log into the session from their respective smartphones and then place all of their phones on the table to form a large array either rectangular, square, or round in shape. Each smartphone is sent a unique identifying symbol which is displayed on its respective smartphone screen. The controller user takes a picture of the array of smartphones and uploads the picture. The invention analyzes the unique identifier on each smartphone screen and determines the size, relative position, and orientation of each smartphone. The invention next maps the source video to the size and shape of the smartphone array so as to maximize the display of the video, keeping the original aspect ratio. The invention then sends the appropriate extract of the total source video to each smartphone and synchronizes the playback of the video such that the video plays over the totality of the smartphones and is viewable as the original source video. One user indicates that his/her smartphone will provide audio and the audio is played through that smartphone. Additional videos can be played or replayed through the same session once initiated, until all of the users remove their smartphones.

DETAILED DESCRIPTION

Figure 1:
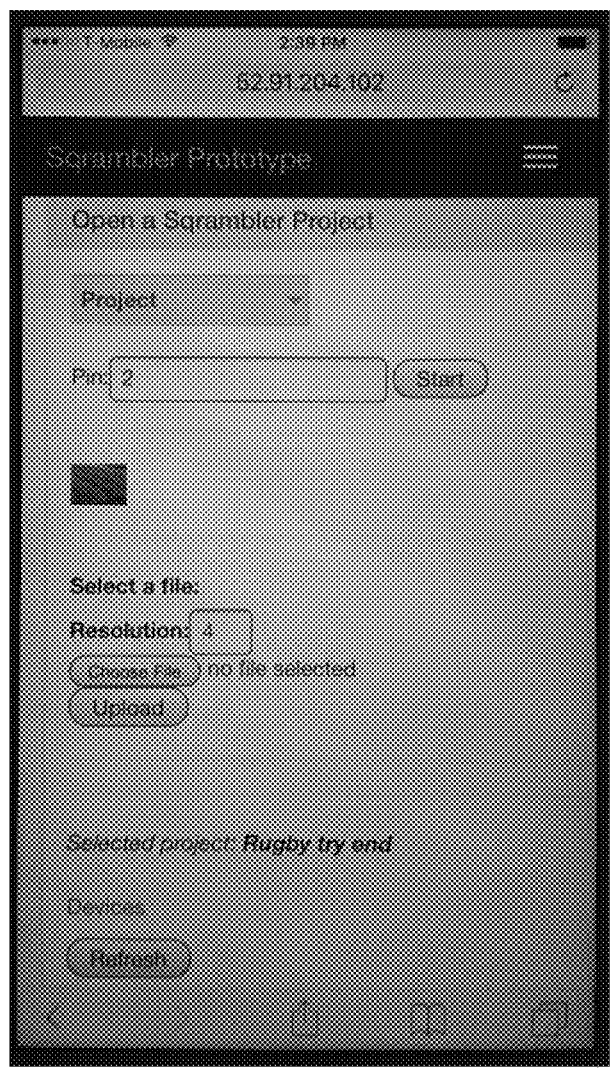
FIG. 1 is an exemplary embodiment of the controller device or smartphone.
Figure 2:
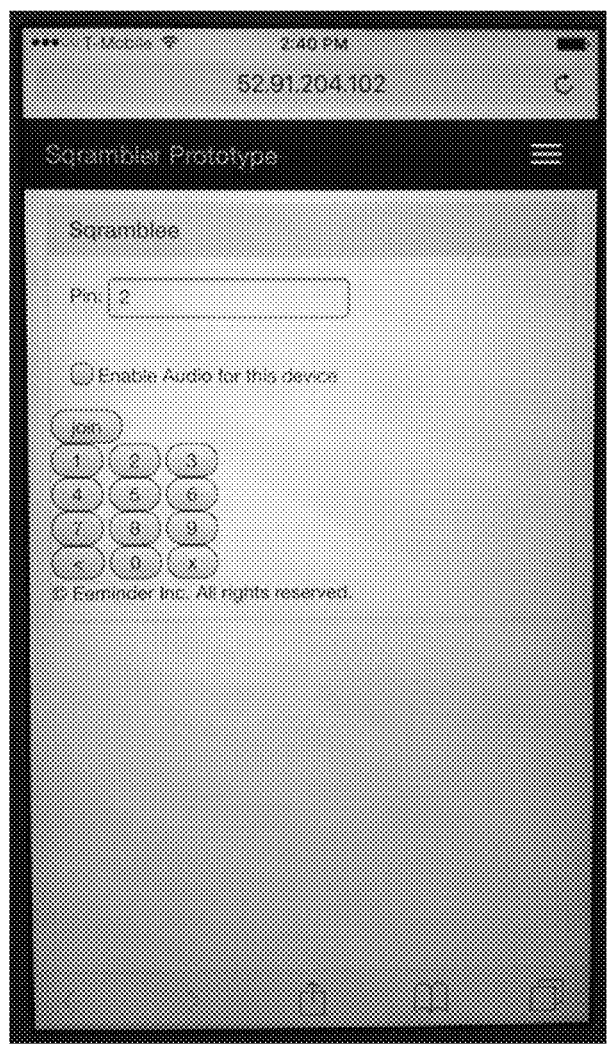
FIG. 2 is an exemplary embodiment of one of the non-controller devices logged in to the array.

The following is a description of exemplary embodiments of the invention, augmented by the included drawings. The embodiments are examples and are described in such detail as to clearly communicate the invention. However the amount of detail offered is not intended to limit the anticipated variations of embodiments; on the contrary, the intention covers all modifications, equivalents, and alternatives falling within the spirit and scope of the present invention as defined by the appended claims. The descriptions and drawings below are designed to make such embodiments obvious to a person of ordinary skill in the art.

Whether properly viewed as devices, methods, or systems, the disclosed invention also permits a machine-accessible medium containing instructions, which when executed by a machine, cause the machine to perform operations for realizing the disclosed functionality of the invention. The invention disclosed herein is realized through use of appropriate equipment and enabling logic optionally reduced to code and/or hardware, which operate to control an ad hoc array of smart phones, cell phones, tablet computers, and other devices that in the aggregate display a collective video on a digital display.

This invention provides a system that allows electronic devices each capable of displaying an image or video to be arranged in an ad hoc array or mosaic and then to generate a single collective image or video (called the "target" image) in such a manner that each device displays the part of the target image or video corresponding to its relative position and size in the array or mosaic aggregate. The method of chopping the target image into pieces, one for each display device, is done so as to maximize the area of display of the target image while taking into account the aspect ratio of the target image, the aspect ratio of the array of display devices, borders along the edges of each device, and presenting the target image or video in as accurate a representation as possible.

Display devices do not need to register their position in the array or mosaic. Instead, the system of the present invention uses image processing and pattern recognition methods known to those of skill in the art to identify the position and orientation of each device (landscape, landscape inverted, portrait, portrait inverted) and send the appropriate crop from the target image or video to that device.

In order to initiate a session utilizing the present invention, a group of users place their display devices, e.g., smartphones, in an ad hoc array or mosaic on a surface, e.g., a table top. The order and orientation of the devices is completely arbitrary, and positioning of the devices within the resulting array or mosaic is random. Subsequently, a de facto feedback loop is established to assign to each display device a portion of the image or video to be played back collectively over the array of display devices. This feedback loop is based on assigning a unique visual identifier to each display device after the array has been assembled, capturing a visual "map" of those identifiers and analyzing the visual "map" to ascertain the relative location of each display device in the array, breaking down the target image or video to be displayed into portions correlating to the visual "map" of the identified display devices, and mapping back each portion of the image or video to be displayed to the corresponding display device.

Figure 3:
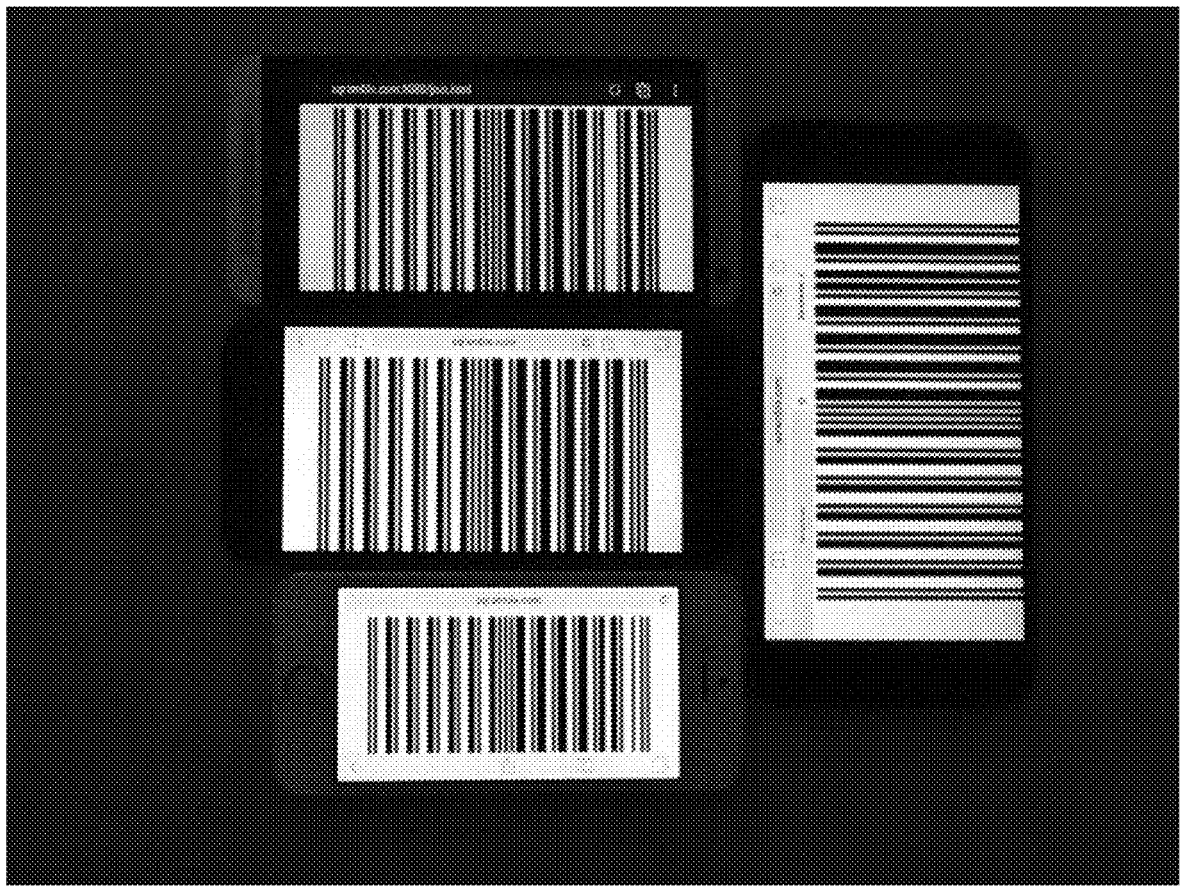
FIG. 3 is an exemplary embodiment of the array of devices with a unique graphical symbol displayed on each device.
Figure 6:
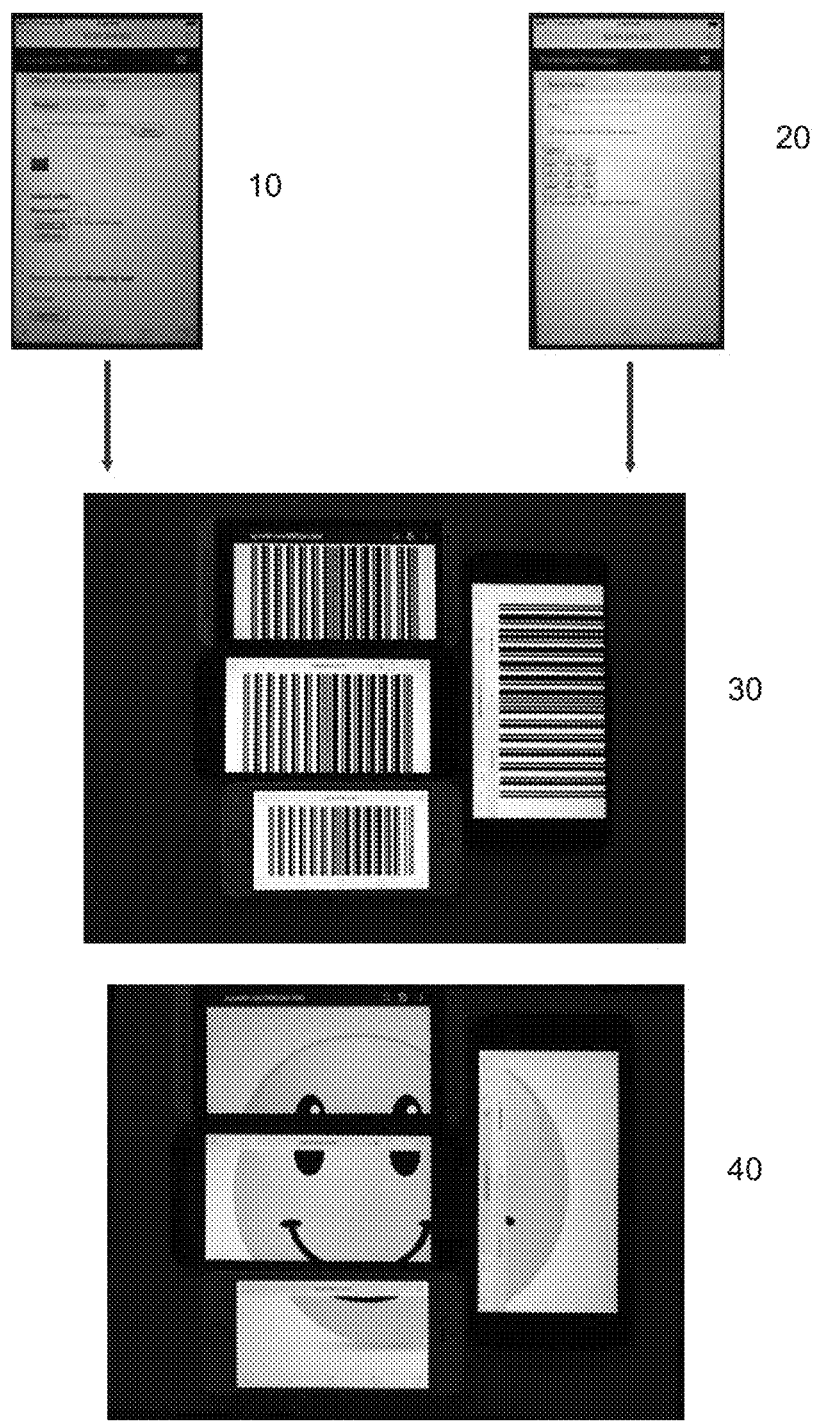
FIG. 6 is an exemplary embodiment of the process of the controller user and the display users interacting with the application, how an array of display devices could be arranged, and how the target video would be displayed over the array of display devices.

A more specific illustration of the process and method of the present invention, including the feedback loop operation, will now be presented. First, each user logs on to a display session. A display session is an instance of the application wherein all users seek to access the same image or video, referred to herein as the target video, for display. The application, consisting of software code and instructions, resides on a computer which has the ability to communicate with each user's display device, commonly referred to as a server, and locally on each users' smartphone or display device as a browser application or an organic application that the user has loaded onto that device. Suitable programs and methods for communicating between the server and the browsers on the individual users' smartphones will be known to those of ordinary skill in the art. The first user to log in instantiates the session using the controller application, choosing the video to be displayed and, in one embodiment of the invention, assigning a pin code to that session, as illustrated by FIG. 1 and by process 10 in FIG. 6. Each subsequent user logs into the session by entering that pin code, as illustrated by process 20, and is sent a unique identifying pattern from the server via the network connecting the server to the user's display device, for display on its screen. After all users have logged into the session, they place their phones or devices on a flat surface, e.g. a table top. Each device, with its display of its unique identifying pattern, is now visible from above. In one exemplary embodiment, this identifier is a barcode that fills most of the screen of the smartphone. When all users' devices have logged in and are positioned to form the array, as shown in FIG. 3, the controller uses his/her smartphone camera to take a picture of the array of the other display devices and uploads that image via the controller application. The controller application is operated by the first user on his smartphone. It remains separate from the array of display devices and is positioned above the array of display devices. As shown in FIG. 1, this application includes selecting the project, which correlates to one target image, setting up the pin code, instantiating the session, and then taking a picture of the array of display devices, each displaying its unique graphical code. The "choose file" button cues up the phone's camera. The user positions his phone above the array of display devices so that they are all visible in the camera viewfinder. When the user clicks the camera switch, a photo is taken and uploaded to the server for processing.

Figure 4:
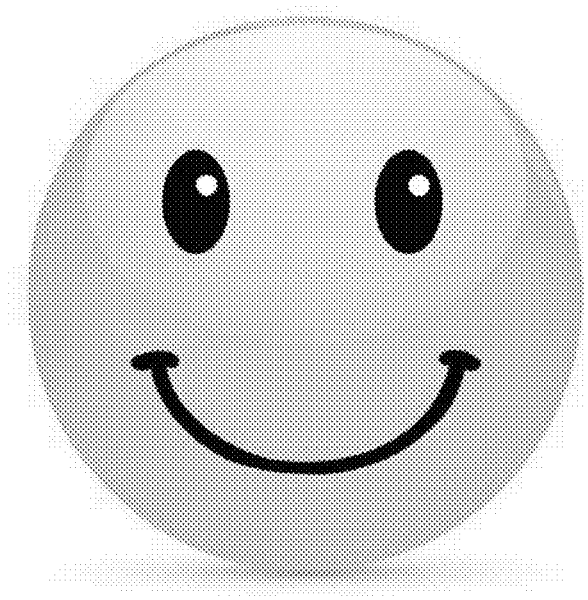
FIG. 4 is an exemplary embodiment of a video being played over the whole device array. For reference the source image is also shown.
Figure 4:

The present invention then uses image processing techniques, of the type which anyone versed in the art would be aware of, and analyzes the image uploaded by the controller. It identifies each of the unique patterns in the image, uses edge detection to determine the (x,y) coordinates for each corner of each unique pattern, and deduces and calculates the position and orientation of each individual device from its pattern. The system further has information about the make, model, and screen resolution of each display device, which was communicated to the server when the display devices logged in to the session. Based on the image analysis and information about the display device screens, the target image or video is mapped to the array of display devices such as to optimize and maximize the display of the target image or video. Employing techniques known to those of ordinary skill in the art, the center of the target image and the center of the device array are first calculated, then the aspect ratios of the target image or video and the device array are compared, yielding a scaling factor, rotational factor, and a translation factor. Further the borders surrounding each device are taken into account. These factors are applied to the target image or video to divide or break the target video into sub-images or sub-videos. This process is a mathematical calculation that would be known by anyone of ordinary skill in the art. For example, matrix mathematics can be employed, where the coordinates of the corners of the screen of each display device are contained in a matrix and the scaling and translation factors are contained in other matrices and they are multiplied together. Each sub-image or sub-video corresponds exactly to what one display device in the array will display. One sub-image or sub-video is sent to each device in the array, which the device displays on its screen. The controller device communicates with the server to initiate the server to command all of the other display devices logged into the session to commence playing the target video. Playback is buffered and streamed to account for varying data rates that different display devices in the array may have, such that all devices' videos are synchronized in time as if the whole device array were one big contiguous screen, as shown in FIG. 4.

Figure 7:
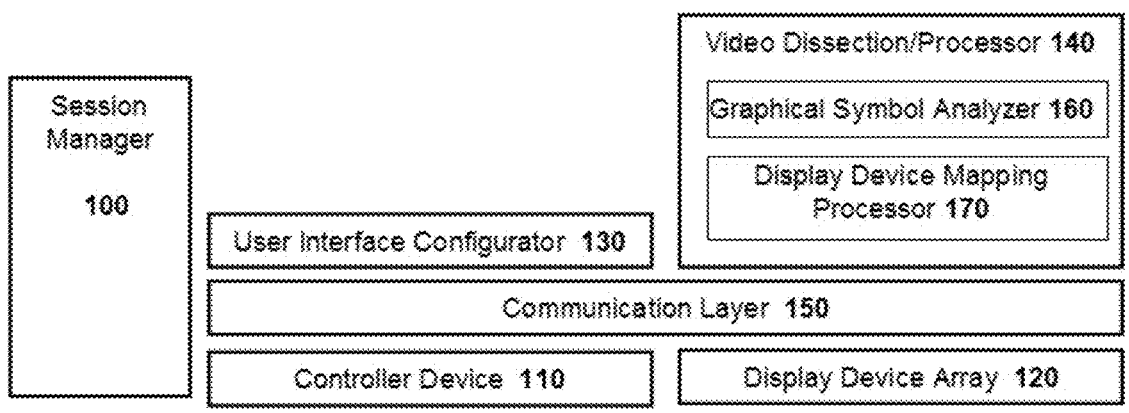
FIG. 7 is an exemplary embodiment of the individual application components that perform the various functions and algorithms to implement the user interface and the feedback loop between the array of display devices and the application.

As illustrated in FIG. 7, the session manager 100 controls the functions of all of the other components of the system. The session manager resides on the server and uses commonly-known techniques to control the session. In one exemplary embodiment, internet/web protocols including java, MSSL, http, https, html5, and Ajax are employed to manage the session and coordinate the flow of information between the server and the various users' devices. The controller user's device is represented by 110 and the other users' display devices are represented by 120. A communication layer 150 accomplishes the sending and receiving of information and signals from the controller device 110 and the display devices 120 using, in alternative embodiments, Html 5 and Ajax in a browser session, or a local application on each device (commonly called an "app"). A user interface configurator 130 creates the physical layout, i.e., what a user sees collectively presented on the displays of the devices in the array, from software code and algorithms that generate the layout and change the layout based on where the application is in its overall sequence of processes. The information presented on each display device at any time is managed via programs and algorithms that would be known to those of ordinary skill in the art. A video dissection/processor 140 comprising a set of programs and algorithms incorporates a graphical symbol analyzer 160 that takes the image uploaded by the controller user and extracts the symbol identifier and values and coordinates of each display device in the array, utilizing image processing techniques including edge detection and symbol decoding as disclosed above to calculate an (x,y) coordinate for each corner of the screen in each display device, in a manner that would be known by those of ordinary skill in the art. The coordinates for each display device screen are then mapped to the target video by a display device mapping processor 170, which creates a set of (x,y) coordinates for the corners of each specific sub-video that will be sent to each specific display device. This calculation uses the center of the image of the array devices, the center of the target image, and the aspect ratios of the target image and the array to maximize the display of the video on the array of display devices. Applying video processing routines and techniques that would be known to anyone of ordinary skill in the art, each sub-image is created and stored on the server. The session manager then sends the appropriate sub-video to each display device, where it is displayed on the device's screen. Using web streaming and buffering algorithms and protocols which would be known to those of ordinary skill in the art, when the controller user presses the "play" button on his device, all display devices commence to play their respective sub-videos at the same time so that all sub-videos are played in synchronization in time and the array appears to be one large contiguous display screen playing the target video.

In one exemplary embodiment of the invention, the distribution and presentation of sub-videos on the respective display devices is accomplished by creating a web socket for each device. A client application, consisting of executable code and algorithms, is either loaded onto each display device via a browser session or pre-loaded via a downloadable application (commonly known as an app). The creation of such a web socket and the client code would be familiar to those of ordinary skill in the art. The system uses http requests to cache BLOB ("Binary Large Object Files") on each device until they are fully buffered on the device. Using a looping structure in the server application software, when the control user presses the "play" button, a loop sequentially sends out a message to command each client application to begin playing its sub-video. Because the time to loop through all devices takes microseconds (millionths of a second), each display device begins playing within one-tenth of a second of the others. Because of the buffering of the video on the client applications, the video continues to play continuously and in synchronization in spite of any latency in communicating with any display device. This implementation of buffering would be very familiar to anyone of ordinary skill in the art.

Figure 5:
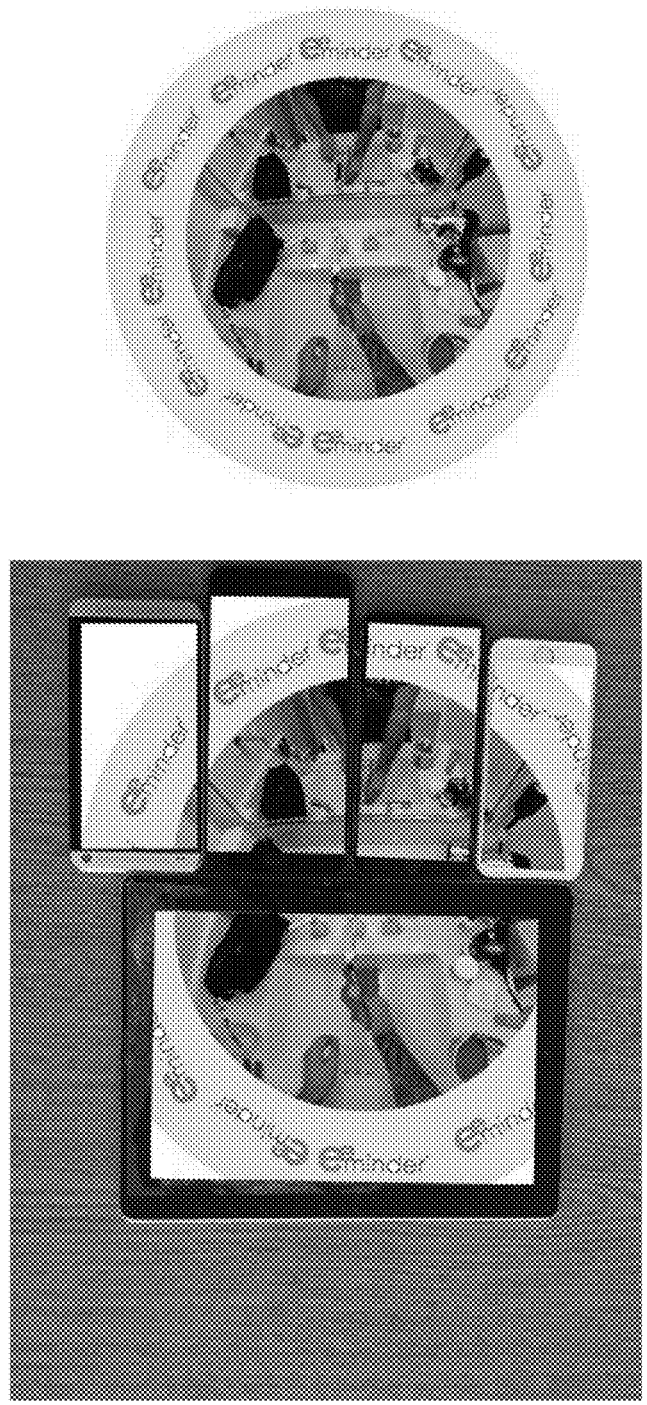
FIG. 5 is an exemplary embodiment of a video with a border for an advertising logo played over the whole device array. For reference the source image is also shown.

Due to the large size of the effective display created by the array of devices, ample room exists to display a banner or border around the video during playback. The process of modifying the video, before it is cut into constituent pieces or sub-videos and sent to the array of display devices to incorporate such a border or banner, would be very familiar to anyone who is versed in the art. As the video plays back, the viewers can see the banner or border sponsorship or advertising content. FIG. 5 shows this process.

The present invention also has functions for session management, adding and managing images and videos, and accessing device information.

Generally the present invention uses an application server, consisting of a computer, an operating system, a network communication protocol, and specially written computer programs and executable files, to send images or videos. An intelligent engine (a computer program) running on the application server interprets inbound images, calculates the most optimal way to map the target image or video to the array of display devices, separates the target image or video into the constituent pieces for each display device logged in, and sends the appropriate piece to each display device.

While the foregoing and accompanying drawings are directed to example embodiments of the disclosed invention herein, other and further embodiments of the invention may be devised without departing from the basic scope thereof.

Although a preferred embodiment of the invention (currently marketed as the "Sqramble" system available at www.sqramble.com) has been described herein, it is recognized that modifications and variations will occur to those skilled in the art which fall within the spirit of the invention and intended scope of the appended claims.

The invention claimed is:

1. A method of making an ad hoc array of a plurality of display devices display one target image or video as one large display screen, the method comprising:
   providing an application, consisting of software code and instructions,
   providing a plurality of display devices with electronically controllable screens or displays, wherein each display device comprises the application;
   providing one controller device comprising the application;
   cueing up a target image or video to be played, and initiating a display session using the controller;
   logging into the display session from the display devices;
   arranging the plurality of display devices into a device array;
   sending a unique identifying symbol from the application to the display devices, wherein the unique identifying symbol is displayed on the respective display device screens;
   taking a picture of the array of display devices displaying the unique identifying symbol with the controller and uploading the picture to the application, wherein the application analyzes the unique identifier on each display device screen and determines the size, relative position, and orientation of each display device and maps the target image or video to the size and shape of the display device array so as to maximize the display of the target image or video, keeping the original aspect ratio,
   wherein the application sends appropriate sub-video of the target image or video to each display device and synchronizes the playback of the sub-videos such that the target image or video plays over the device array in synchronization as one large display screen.

2. The method of claim 1, wherein the display devices are selected from the group consisting of a cell phone, a smart phone, a tablet computer, other devices with an electronically controllable screen or display, and combinations thereof.

3. The method of claim 1, wherein the unique identifying symbol is selected from the group consisting of a barcode, and a graphical symbol.

4. The method of claim 1, wherein the unique identifying symbol is dynamically generated.

5. The method of claim 1, wherein additional videos can be played or replayed through the same session once initiated, until the user removes their display device.

6. The method of claim 1, wherein the target video is a still frame image.

7. The method of claim 1, wherein the target video is amended to contain a banner or border for the display of other information while the video plays on the device array.

8. The method of claim 1, wherein there is under one-tenth second variance between the sub-video playing on each of the display devices.

9. The method of claim 1, wherein the device array comprises a plurality of display devices are arranged in an ad hoc mosaic.

10. The method of claim 1, wherein the application resides on a device selected from the group consisting of a server, a display device, and both a server and display device.

11. The method of claim 1, wherein the display devices and controller communicate wirelessly.

12. A method of making an ad hoc array of a plurality of display devices display one target image or video as one large display screen, the method comprising:
   providing an application, consisting of software code and instructions,
   providing a plurality of display devices with electronically controllable screens or displays, wherein each display device comprises the application;
   providing one controller device comprising the application;
   cueing up a target video to be played, and initiating a display session using the controller;
   logging into the display session from the display devices;
   arranging the plurality of display devices into a device array;
   using a feedback loop to determine the size, relative position, and orientation of each display device,
   wherein the application analyzes the size, relative position, and orientation of each display device and maps the target image or video to the size and shape of the display device array so as to maximize the display of the image or video, keeping the original aspect ratio,
   wherein the application sends appropriate sub-video of the target image or video to each display device and synchronizes the playback of the sub-videos such that the target image or video plays over the device array in synchronization as one large display screen.

13. The method of claim 12, wherein the display devices are selected from the group consisting of a cell phone, a smart phone, a tablet computer, other devices with an electronically controllable screen or display, and combinations thereof.

14. The method of claim 12, wherein additional videos can be played or replayed through the same session once initiated, until the user removes their display device.

15. The method of claim 12, wherein the target video is a still frame image.

16. The method of claim 12, wherein the target video is amended to contain a banner or border for the display of other information while the video plays on the device array.

17. The method of claim 12, wherein there is under one-tenth second variance between the sub-video playing on each of the display devices.

18. The method of claim 12, wherein the device array comprises a plurality of display devices are arranged in an ad hoc mosaic.

19. The method of claim 12, wherein the application resides on a device selected from the group consisting of a server, a display device, and both a server and display device.

20. The method of claim 12, wherein the display devices and controller communicate wirelessly.

* * * * *